US012669255B2

(12) United States Patent
Mowlavi et al.

(10) Patent No.: US 12,669,255 B2
(45) Date of Patent: Jun. 30, 2026

(54) PHYSICS-INFORMED SMOOTH OPERATOR LEARNING FOR HIGH-DIMENSIONAL SYSTEMS PREDICTION AND CONTROL

(71) Applicant: Mitsubishi Electric Research Laboratories, Inc., Cambridge, MA (US)

(72) Inventors: Saviz Mowlavi, Somerville, MA (US); Xiaoyu Xie, Evanston, IL (US); Mouhacine Benosman, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 375 days.

(21) Appl. No.: 18/502,530

(22) Filed: Nov. 6, 2023

(65) Prior Publication Data

US 2025/0146695 A1     May 8, 2025

(51) Int. Cl.
*F24F 11/64*          (2018.01)
*G05B 13/02*         (2006.01)
(Continued)

(52) U.S. Cl.
CPC ............ *F24F 11/64* (2018.01); *G06N 3/0455* (2023.01); *G05B 13/02* (2013.01); *G05B 13/04* (2013.01); *G06F 17/13* (2013.01); *G06N 3/09* (2023.01)

(58) Field of Classification Search
None
See application file for complete search history.

(56) References Cited

U.S. PATENT DOCUMENTS 9,754,221 B1 *  9/2017  Nagaraja ................ G06N 3/094
11,280,514 B1 *  3/2022  Laftchiev ................. F24F 11/62
(Continued)

FOREIGN PATENT DOCUMENTS

EP          3848836 A1 *  7/2021  ............... G06N 3/09

OTHER PUBLICATIONS

Asvadi-Kermani et al., "Energy Optimization of Air Handling Units Using Constrained Predictive Controllers Based on Dynamic Neural Networks", May 2022, IEEE Access. (Year: 2022).*
Xiaoyu et al., "Smooth and Sparse Latent Dynamics in Operator Learning with Jerk Regularization", Dec. 2025, Mitsubishi Electric Research Laboratories. (Year: 2025).*

(Continued)

*Primary Examiner* — Mohammad Ali
*Assistant Examiner* — Kelvin Booker
(74) *Attorney, Agent, or Firm* — Gene Vinokur

(57)          ABSTRACT

An operator learning model generator is provided for training a smooth operator learning model for predicting airflow dynamics in a room used by a controller connected to a heating, ventilation and air conditioning (HVAC) system. The operator learning model generator includes an interface circuit configured to receive a training dataset via a network connected to a simulation computer, wherein the training dataset includes solution trajectories of airflow in the room for various times series of control actions given to the HVAC system, a memory configured to store the smooth operator learning model comprising an auto-encoder and a neural ordinary differential equation, the training dataset, and training instructions for the smooth operator learning model, and a processor configured to train the smooth operator learning model stored in the memory, wherein the training instructions comprise a jerk regularization that enforces smoothness of the dynamics predicted by the smooth operator learning model.

12 Claims, 9 Drawing Sheets

(51) Int. Cl.

| | |
|---|---|
| *G05B 13/04* | (2006.01) |
| *G06F 17/13* | (2006.01) |
| *G06N 3/04* | (2023.01) |
| *G06N 3/0455* | (2023.01) |
| *G06N 3/09* | (2023.01) |

(56) References Cited

U.S. PATENT DOCUMENTS

| | | | | |
|---|---|---|---|---|
| 11,416,739 | B2 * | 8/2022 | Qin | G05B 17/02 |
| 2019/0236446 | A1 * | 8/2019 | Qin | G05B 17/02 |
| 2021/0012156 | A1 * | 1/2021 | Vijaykeerthy | G06N 3/08 |
| 2021/0190364 | A1 * | 6/2021 | Lee | G05B 13/027 |
| 2021/0209507 | A1 * | 7/2021 | Zafar | G16H 50/20 |
| 2023/0243541 | A1 * | 8/2023 | Stesco | G05B 15/02 |
| | | | | 700/276 |
| 2023/0341141 | A1 * | 10/2023 | Nabi | F24F 11/63 |

OTHER PUBLICATIONS

Mowlavi et al., "Reinforcement Learning-Based Estimation for Partial Differential Equations", Jan. 2023, arxiv.org/abs/2302.01189 (Year: 2023).*

H. Lange, S. L. Brunton, and N. Kutz, "From fourier to koopman: Spectral methods for long-term time series prediction," arXiv preprint arXiv:2004.00574, 2020.

Lu Lu , Pengzhan Jin, and George Em Karniadakis, "DeepONet: Learning nonlinear operators for identifying differential equations based on the universal approximation theorem of operators", arXiv:1910. 03193 (cs), 2019.

Zongyi Li, Nikola Kovachki, Kamyar Azizzadenesheli, Burigede Liu, Kaushik Bhattacharya, Andrew Stuart, Anima Anandkumar, "Fourier Neural Operator for Parametric Partial Differential Equations", arXiv:2010.08895 (cs), 2020.

* cited by examiner

PHYSICS-INFORMED SMOOTH OPERATOR LEARNING FOR HIGH-DIMENSIONAL SYSTEMS PREDICTION AND CONTROL

TECHNICAL FIELD

The present disclosure relates generally to system modeling, prediction and control, and more particularly to systems and methods of reduced order modeling and control of high dimensional physical systems using a neural network model.

BACKGROUND

Control theory in control systems engineering is a subfield of mathematics that deals with the control of continuously operating dynamical systems in engineered processes and machines. The goal is to develop a control policy for controlling and regulating the behavior of such systems. The control policy specifies an appropriate control action at every time on the system in order to achieve a desired outcome, which is defined by an objective function. Examples of desired outcomes specified by an objective function include stabilizing the system or tracking a desired state trajectory while minimizing a certain cost.

A control policy may be open-loop, in which case the control action at a given time is not a function of the current state of the system. A control policy may also be closed-loop, in which case the control action at a given time is a function of the current state of the system, reconstructed in real time from physical sensors data using an estimation algorithm.

A physical model of the dynamics of a system, or a physical model of a system, describes the dynamics of the system using ordinary differential equations (ODEs) or partial differential equations (PDEs). These ODEs or PDEs are constructed from physical conservation laws and physical principles, and they may be linear or nonlinear. Given an initial state and an arbitrary sequence of control actions, the physical model of a system may be used to predict the future state of the system at any desired time.

An operator learning model of the dynamics of a system, or operator learning model of a system, describes the dynamics of the system using a neural network model. The operator learning model is constructed using operational data generated by the system. Same as for the physical model, the operator learning model may be used to predict the future state of the system at any desired time given an initial state and an arbitrary control sequence. However, the computational cost of solving the operator learning model may be much smaller than that of solving the physical model, especially in the case of physical models described by PDEs.

One class of methods for developing a control policy consists of model-based techniques in which the physical model of a system is directly used when designing the control policy. Such methods may be open-loop or closed-loop and may be applied to control dynamical systems of various complexities. Examples of such systems may include production lines, car engines, robots, numerically controlled machining, motors, satellites, and power generators. An advantage of model-based techniques is that the resulting control policies possess performance guarantees since they are designed based on the system dynamics.

A high-dimensional system is a system whose state is high-dimensional, meaning that it is described by a very large number of variables or by a continuous function of space. Examples of such systems include power networks, buildings, airflow in a room, and smart grids. Systems whose physical model is described by PDEs are always high-dimensional. For high-dimensional systems, the physical model of the system may be computationally very expensive to solve, especially in the case of physical models described by PDEs. As a result, model-based control policies for high-dimensional systems may be too computationally expensive to implement in a computer architecture.

Thus, another class of methods for developing a control policy consists of data-driven techniques that exploit operational data generated by a system in order to construct control policies that achieve the desired outcome.

In an example of data-driven techniques, a control policy may be directly constructed from the operational data. A drawback of such methods is the potential requirement for large quantities of data and the lack of performance guarantees when the state of the system during operation differs from the states present in the data used to construct the control policy.

In another example of data-driven techniques, a simplified surrogate model of a system may first be constructed using operational data generated by the system. The simplified model predicts the future state of the system at any desired time given an initial state and an arbitrary control sequence, and it may be in the form of an operator learning model. Then, the control policy may be designed from model-based techniques applied to the simplified model. When the computational cost of solving the simplified model is low, the resulting model-based control policy can be implemented online in a computer architecture. Nevertheless, constructing a simplified surrogate model of a system with sufficient accuracy to ensure a good control policy performance may require large quantities of data.

To address the aforesaid issue, some methods of constructing an operator learning model incorporate the physical model, represented by PDEs, into the training process for the neural network. The advantage is that the resulting operator learning model may require less training data since it learns to satisfy the physical conservation laws that govern the dynamics of the system. However, these methods do not incorporate the smoothness property of the dynamics, inherent to most physical systems, into the training process. The smoothness property of the dynamics is the property that the state of the system changes in time in a smooth manner on a sufficiently short time scale. Thus, operator learning models constructed with these methods may not display sufficient accuracy to ensure good performance of model-based control policies designed based on these surrogate models.

To that end, there exists a need for a method and a system for incorporating the smoothness property of the dynamics into an operator learning model, so that an effective control policy based on this operator learning surrogate model may be implemented in a computer architecture for controlling high-dimensional dynamical systems.

SUMMARY

The embodiments of the invention provide a computer-implemented method and a system for training a smooth operator learning surrogate model of a high-dimensional dynamical system with control inputs, by utilizing the smoothness property of the dynamics to regularize the training procedure. The operator learning surrogate model may be used to predict the future state of the system at any desired time given an initial state and an arbitrary control sequence. The operator learning surrogate model possesses an autoencoder architecture that includes an encoder neural network, a nonlinear propagator consisting of a neural ODE, and a decoder neural network. The encoder is configured to encode the digital representation of a high-dimensional state at initial time into a low-dimensional latent vector that belongs to a latent space, the neural ODE propagator is configured to propagate the latent vector in latent space using a nonlinear transformation, and the decoder is configured to decode the propagated latent vector in latent space back to a digital representation of the high-dimensional state.

The computer-implemented method comprises collecting a digital representation of the sequence of high-dimensional states of the system at different instances of time during its operation, together with a digital representation of the time series of control action values given to the system during its operation. This collection is carried out many times, starting from different initial conditions of the state and using time series of control action values. For a given initial condition of the state, the sequence of states at different time instances and the time series of control action values are referred to as a solution trajectory. The ensemble of collected solution trajectories is referred to as the training set.

The computer-implemented method further comprises training the operator learning model in two stages.

In the first training stage, the encoder and decoder are trained to compress high-dimensional states into low-dimensional latent vectors and vice-versa. To this effect, at each training iteration, the sequence of high-dimensional states belonging to a randomly sampled solution trajectory in the training set is given as input to the encoder, which outputs a corresponding sequence of low-dimensional latent vectors. These latent vectors are then given as input to the decoder, which outputs a corresponding sequence of high-dimensional states. The loss then comprises two parts. The first part penalizes the mean square error between the sequence of states returned as output by the decoder and the ground truth sequence of states given as input to the encoder. The second part penalizes the jerk along the curve traced out by the sequence of latent vectors in latent space. Since this sequence of latent vectors is obtained from the sequence of states belonging to a given solution trajectory, minimizing the jerk of the trajectory in the latent space is equivalent to enforcing the smoothness property of the dynamics.

In the second training stage, the neural ODE propagator is trained to learn the dynamics of the system in the latent space. To this effect, each solution trajectory in the training set is first mapped to the latent space by passing its high-dimensional state sequence to the encoder, resulting in a corresponding ground truth latent vector sequence. Then, at each training iteration, the ground truth initial latent vector and the times series of control action values corresponding to a randomly sampled trajectory are given to the neural ODE propagator, which returns the corresponding latent vector sequence. The loss then penalizes the mean square error between the latent vector sequence predicted by the neural ODE propagator and the ground truth latent vector sequence.

In some embodiments, the training set of solution trajectories is obtained by a numerical solver, which solves the PDEs defined by the physical model of the system. For example, if the system of interest is airflow in a room with air conditioning control, computational fluid dynamics (CFD) simulations may be used to calculate solution trajectories. CFD simulations resolve the physical Navier-Stokes equations governing the motion of fluid flows in order to obtain the sequence of states corresponding to an initial state and an arbitrary sequence of control actions.

In some embodiments, the method further comprises incorporating the physical model, represented by PDEs, into the second training stage for the neural ODE propagator. In that case, the loss comprises an additional physics-informed term that penalizes the mean square error between the time derivative of the latent vector predicted by the neural ODE and the ground truth time derivative coming from the PDEs defined by the physical model. The second part can be evaluated on latent vectors corresponding to states in the training set trajectories, or it can be evaluated on latent vectors corresponding to arbitrary states that satisfy the boundary conditions or other constraints associated with the system. Such incorporation of the physical model into the method of training results in a physics-informed operator learning model.

In some embodiments, the method further comprises generating control actions to control the system in real time using a model-based control policy, where the model used to design the control policy is the trained operator learning surrogate model, and the goal of the control is to minimize an objective function specified by a user.

In some embodiments, the method further comprises generating control actions to control the system based on a hybrid model-based and reinforcement learning control policy, where the model used to design the control policy is the trained operator learning surrogate model. Starting from a model-based control policy as a warm start, the hybrid model-based and reinforcement learning approach iteratively refines the parameters of the policy to achieve better control performance by alternating between collecting data using the current control policy and updating the policy parameters to minimize the objective function specified by the user.

According to some embodiments of the present invention, an operator learning model generator is provided for training a smooth operator learning model including an auto-encoder and a neural ordinary differential equation (ODE) used by a heating, ventilation and air conditioning (HVAC) controller in a system comprising the airflow in a room with an HVAC actuator. The operator learning model generator may include an interface circuit configured to receive a training dataset via a network connected to a simulation computer, wherein the training dataset includes solution trajectories of airflow in the room starting from different initial conditions of the state and using different time series of HVAC actuator control actions; a memory configured to store a smooth operator learning model for predicting the dynamics of airflow in the room, the training dataset, and training instructions for the smooth operator learning model; and a processor configured to train the smooth operator learning model stored in the memory, wherein the training instructions comprise steps of: training the auto-encoder to learn a mapping from a high-dimensional state space to a low-dimensional latent space based on a training loss, wherein the training loss includes both a reconstruction loss and a jerk loss evaluated on the solution trajectories belonging to the training dataset; and training the neural ODE network to learn the solution trajectories belonging to the training dataset mapped through the encoder to the low-dimensional latent space.

Further, some embodiments of the present invention provide a computer-implemented method for training a smooth operator learning model including an auto-encoder and a neural ordinary differential equation (ODE) used by a controller for a continuously operating dynamical system in an engineered process or a machine. The computer-implemented method may include receiving, using an interface circuit, a training dataset via a network connected to a simulation computer, wherein the training dataset include a collection of solution trajectories of the system starting from different initial conditions of the state and using different time series of control actions; uploading a smooth operator learning model for predicting the dynamics of the continuously operating dynamical system, the training dataset, and training instructions to a processor from a memory; and training, using the processor, the smooth operator learning model based on the training instructions, wherein the training instructions comprise steps of: training the auto-encoder to learn a mapping from a high-dimensional state space to a low-dimensional latent space based on a training loss, wherein the training loss includes both a reconstruction loss and a jerk loss evaluated on the solution trajectories belonging to the simulation dataset; and training the neural ODE network to learn the solution trajectories belonging to the training dataset mapped through the encoder to the low-dimensional latent space.

BRIEF DESCRIPTION OF THE DRAWINGS

The accompanying drawings, which are included to provide a further understanding of the invention, illustrate embodiments of the invention and together with the description to explain the principle of the invention. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In describing embodiments of the disclosure, the following definitions are applicable throughout the present disclosure. A "control system" or a "controller" may be referred to a device or a set of devices to manage, command, direct or regulate the behavior of other devices or systems. The control system can be implemented by either software or hardware and can include one or several modules. The control system, including feedback loops, can be implemented using a microprocessor. The control system can be an embedded system.

An "air-conditioning system" or a heating, ventilating, and air-conditioning (HVAC) system may be referred to a system that uses a vapor compression cycle to move refrigerant through components of the system based on principles of thermodynamics, fluid mechanics, and/or heat transfer. The air-conditioning systems span a broad set of systems, ranging from systems which supply only outdoor air to the occupants of a building, to systems which only control the temperature of a building, to systems which control the temperature and humidity.

A "central processing unit (CPU)" or a "processor" may be referred to a computer or a component of a computer that reads and executes software instructions. Further, a processor can be "at least one processor" or "one or more than one processor".

Figure 1:
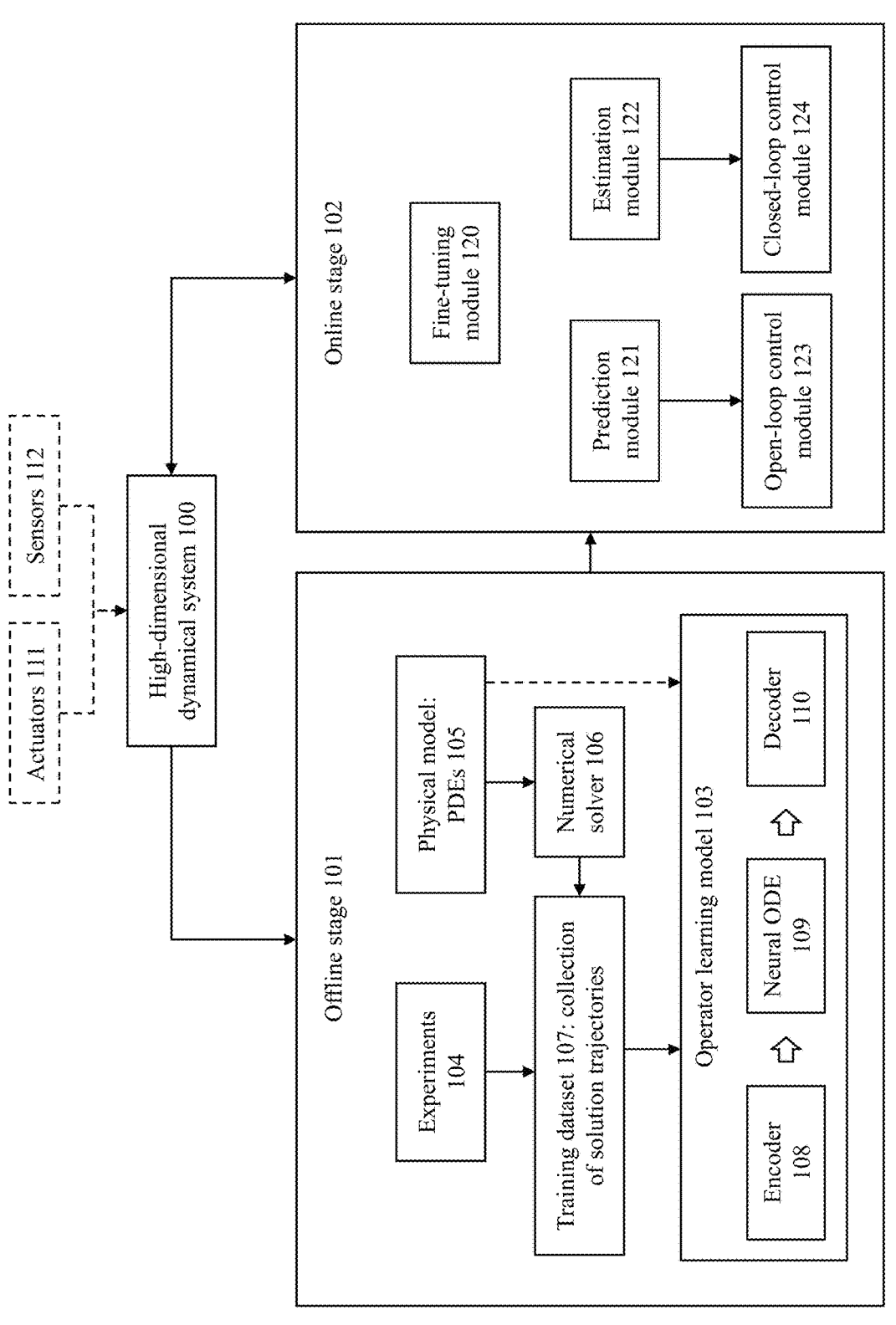
FIG. 1 is a flow diagram of a method for constructing an operator learning model of a dynamical system offline, and using the operator learning model to fine-tune and control the system online, according to according to some embodiments of the present disclosure.

FIG. 1 is a flow diagram of a method (called an operator learning model generator) for constructing a surrogate smooth operator learning model 103 of a high-dimensional dynamical system 100 in an offline stage 101, and using the operator learning model to fine-tune and/or control the system in an online stage 102, according to some embodiments of the present disclosure. The dynamical system 100 may contain actuators 111, and it may contain sensors 112. The physical model of the system may be described by PDEs. In some embodiments, the system may possess control inputs. For simplicity, in the following description, we will refer to the surrogate smooth operator learning model 103 as an operator learning model.

The offline stage 101 includes an operator learning model 103. The operator learning model 103, described in FIG. 2, comprises an encoder neural network 108, a neural ODE 109, and a decoder neural network 110. The offline stage 101 may further include an experiments module 104, a physical model 105 describing the dynamics of the system 100 using ODEs or PDEs, a high-fidelity numerical solver module 106, and a training dataset 107 consisting of a collection of solution trajectories of the system. Each solution trajectory includes an initial condition for the state, a time series of control action values, and the resulting sequence of states at different time instances during the operation of the system 100. For example, a solution trajectory for airflow in a room might describe the velocity and temperature fields at different times as they evolve from an initial condition due to forcing from an HVAC system. The solution trajectories in the training dataset 107 correspond to various initial conditions for the state and various time series of control action values. The online stage 102 may include a fine-tuning module 120, a prediction module 121, an estimation module 122, an open-loop control module 123, and a closed-loop control module 124 to control the system 100 during its online operation.

The encoder neural network 108, the neural ODE 109, and the decoder neural network 110 may consist of fully-connected neural networks (FNN) or convolutional neural networks (CNN) whose parameters are trained offline and tuned online based on the computer-implemented method of the present disclosure. In the offline stage 101, the operator learning model generator trains the operator learning model 103 using the solution trajectories contained in the training dataset 107. The training determines the parameter values of the operator learning model 103 so that it can predict the evolution of the state of the system 100 given an initial condition for the state and a time series of control action values. The method of the present disclosure improves the prediction performance over the current state-of-the-art by enforcing the smoothness property of the dynamics in the training of the operator learning model. Furthermore, in some embodiments, the operator learning model 103 may additionally be trained using the physical model 105, in such a way that the system dynamics predicted by the operator learning model 103 respect the PDEs describing the physical model 105. In the online stage 102, according to some embodiments, the method may fine-tune the operator learning model 103 using sensor measurements obtained from the online operation of the real system.

In practical applications, usage of a surrogate operator learning model 103 instead of the physical model 105 of the high-dimensional system 100 may be necessary. For example, solving the physical model 105 may be computationally intractable on platforms with limited computing capability such as embedded and autonomous devices. For instance, in an HVAC system, solving the physical model means solving the Navier-Stokes equations on a fine grid in real time, which may exceed the computing capabilities of the CPU of the HVAC system. On the other hand, solving the surrogate operator learning model 103 may be cheap. Finally, even when solving the physical model 105 may be possible (e.g., by utilizing a remote cluster), executing control over the resulting model, which is an end goal for an HVAC system, may still be intractable. Indeed, executing control may require multiple iterative evaluations of the physical model 105 at each time step.

The computer-implemented method of the present disclosure may include collecting the solution trajectories contained in the training dataset 107. The solution trajectories contained in the training dataset 107 may be generated by performing experiments using the experiments module 104 or by computing numerical solutions of the physical model 105 using the high-fidelity numerical solver module 106 implemented on a simulation computer.

In some embodiments, the numerical solver module 106 may consist of a computational fluid dynamics (CFD) solver, which utilizes numerical analysis and data structures to solve the Navier-Stokes equations governing the dynamics of fluid flows. For example, computers may be used to perform calculations required to simulate the flow of a fluid as it interacts with surfaces defined by boundary conditions. Further, multiple software have been designed to provide good accuracy in complex simulation scenarios associated with transonic or turbulent flows that may arise in applications, such as in HVAC applications to describe the airflow in a room with an HVAC. Initial validation of such software may typically be performed using experimental data. In addition, previously performed analytical or empirical analysis of a particular problem related to the airflow associated with the system may be used for comparison in the CFD simulations.

In the online stage 102, the operator learning model 103 may be utilized with the open-loop control module 123 or the closed-loop control module 124 to control the system 100, according to some embodiments of the present disclosure. Since the operator learning model 103 learns the dynamics of the system 100, it may be used to predict the evolution of the state or control the operation of the system beyond the time horizon of the solution trajectories present in the training dataset 107.

The open-loop control module 123 contains an open-loop control policy that generates commands to control the operation of the system 100 in order to achieve a desired outcome defined by an objective function. A prediction module 121 may be used to generate trajectories of the state of the system 100, which may then be utilized by the open-loop control module 123 to generate optimal control actions.

Alternatively, the closed-loop control module 124 contains a closed-loop control policy that generates commands to control the operation of the system in order to achieve a desired outcome defined by an objective function, where each control action is computed based on the current estimated state of the system 100. The estimation module 122 may be used to compute the current estimated state of the system 100 based on a history of noisy sensor measurements up to current time, which may then be utilized by the closed-loop control module 124 to generate optimal control actions. For example, for a room controlled by an HVAC system, sensors may record data such as temperature, velocity, and humidity at specific locations. The estimation module may then be used to reconstruct in real time the spatial distribution of temperature and velocity in the room based on the sensor measurements. The reconstructed models of temperature and velocity may then be utilized by the control module 124 to generate HVAC control actions in order to achieve a desired distribution of velocity and temperature in the room.

Figure 2:
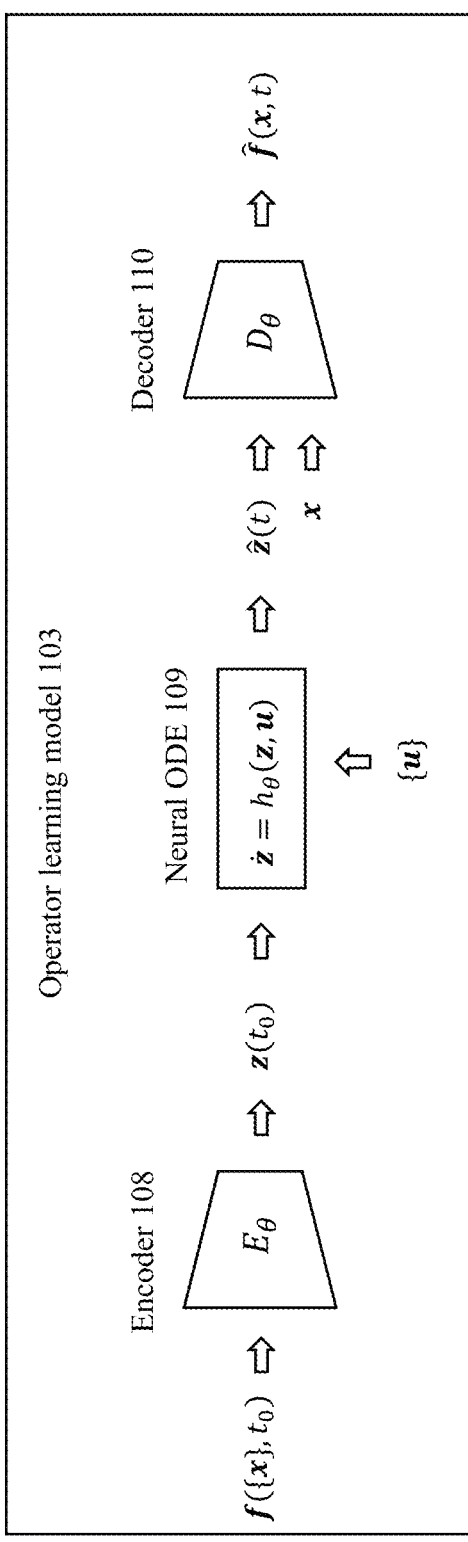
FIG. 2 is a schematic diagram of the architecture of the operator learning model, according to according to embodiments of the present disclosure.

FIG. 2 is a schematic diagram of the architecture of the operator learning model 103, according to some embodiments of the present disclosure. The encoder neural network 108 is denoted by $E_\theta$, the neural network defining the neural ODE 109 is denoted by $h_\theta$, the decoder neural network 110 is denoted by $D_\theta$, and $\theta$ refers to the trainable parameters of all three neural networks. In some embodiments, the state of the system is described by a continuous function of space denoted as $f(x,t)$, where f is a physical quantity, x is a spatial coordinate (or location), and t is time. For example, for airflow in a room, $f(x,t)$ may represent the spatial distribution of velocity and temperature in the room at time t. The state of the system is high-dimensional since an accurate digital representation of the continuous function of space $f(x,t)$ requires to sample f at a large number of spatial locations x. Starting from an initial condition $f(x,t_0)$ for the state at initial time to, and given a time series of control action values $u(t')$, $t_0 \leq t' \leq t$ the operator learning model 103 may be used to predict the future state $f(x,t)$ of the system at an arbitrary time t as follows. First, $f(\{x\},t_0)$, a digital representation of the initial condition sampled at a finite (but potentially large) number of spatial locations $\{x\}$ is given as input to the encoder 108, which outputs a low-dimensional latent vector at initial time $$z(t_0) = E_\theta(f(\{x\}, t_0)).$$

The latent vector is then passed to the neural ODE 109, which parametrizes the dynamics of the latent vector using ODEs defined through a neural network $h_\theta$ as $$\dot{z} = h_\theta(z, u).$$

By integrating the neural ODE 109 from $t_0$ to $t$, the latent vector $\hat{z}(t)$ is obtained. The decoder 110 is a neural network that takes $\hat{z}(t)$ and an arbitrary spatial location $x$ as input, and outputs $$\hat{f}(x, t) = D_\theta(\hat{z}(t), x),$$

which is an approximation of the true state $f(x,t)$. By taking $x$ as an input, the decoder 110 produces a continuous representation $\hat{f}(x,t)$ of the continuous state $f(x,t)$. Such parametrization of continuous functions using neural networks are called implicit neural representations.

Figure 3A:
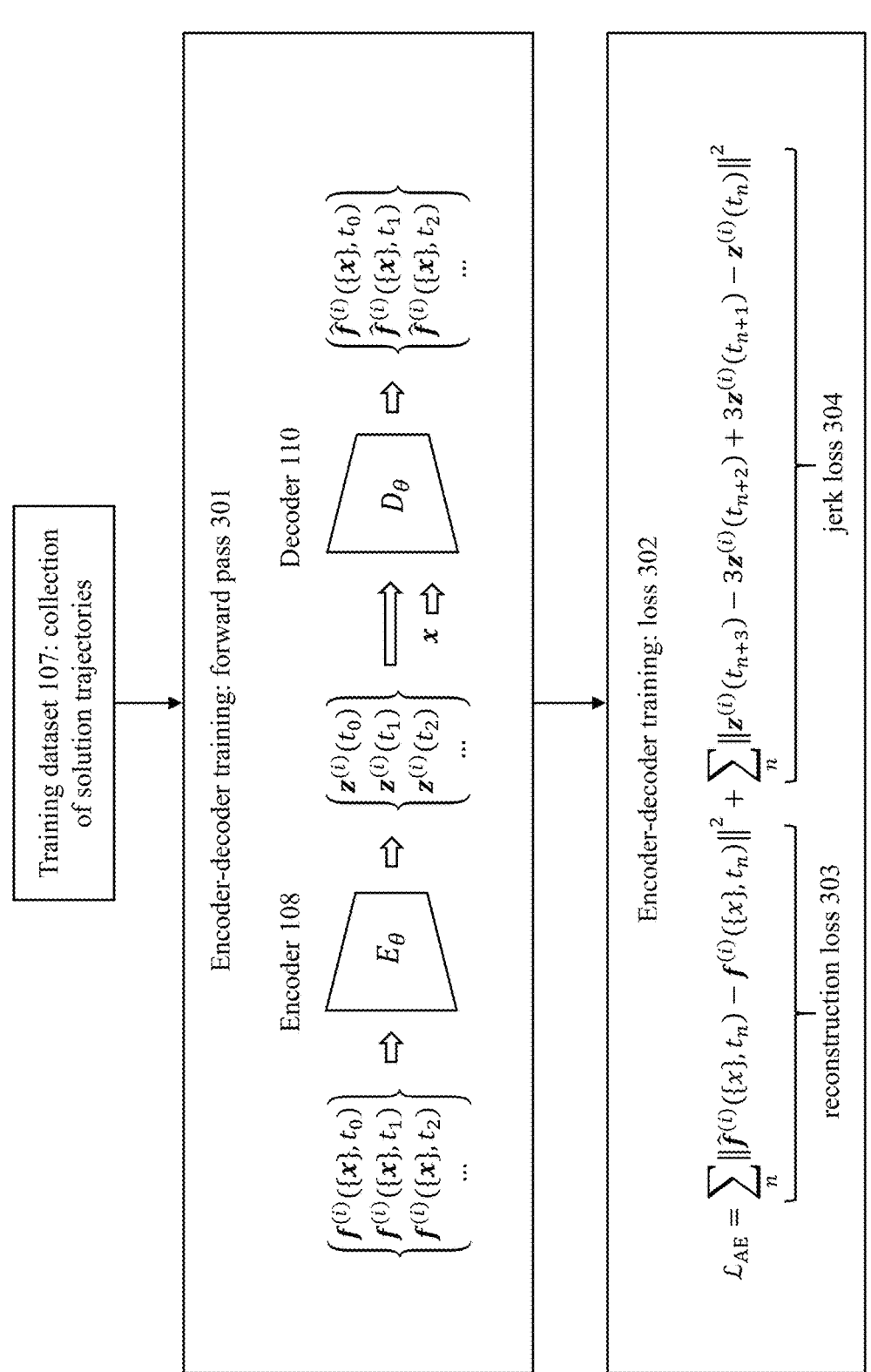
FIG. 3A is a schematic diagram illustrating the first training stage of the operator learning model, according to embodiments of the present disclosure.
Figure 3B:
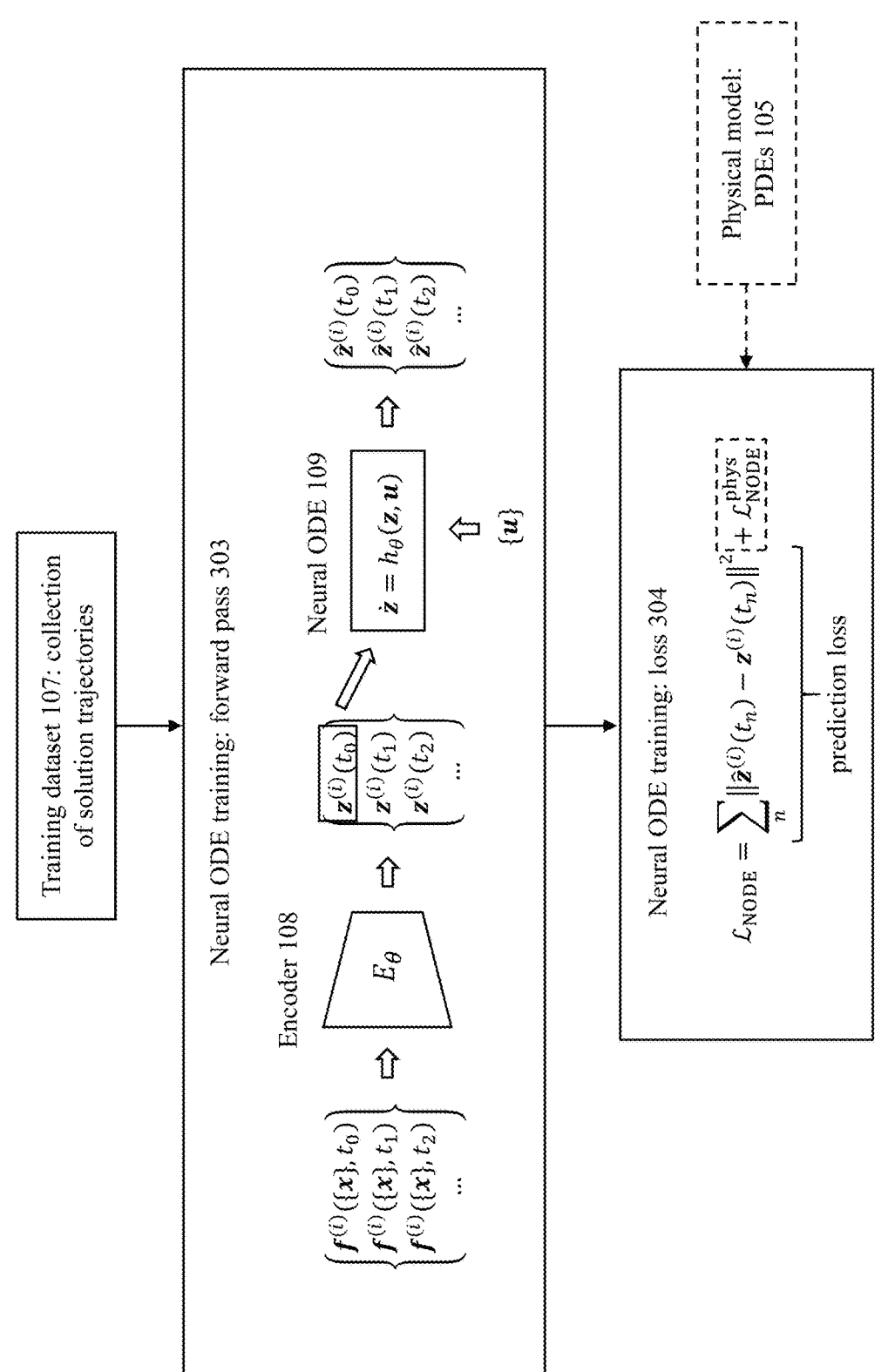
FIG. 3B is a schematic diagram illustrating the second training stage of the operator learning model, according to embodiments of the present disclosure.

The computer-implemented operator learning model generator method of the present disclosure provides training instructions to train the operator learning model 103 in a two-stage procedure described in FIGS. 3A and 3B. This two-step training procedure determines the parameter values $\theta$ of the encoder neural network 108 ($E_\theta$), the neural ODE 109 ($h_\theta$), and the decoder neural network 110 ($D_\theta$), in order for $\hat{f}(x,t)$ to be an accurate approximation of the true state $f(x,t)$ at time $t$, starting from an arbitrary initial condition $f(x,t_0)$ and given an arbitrary time series of control action values $u(t)$.

We denote the solution trajectories in the training dataset 107 by $$\{f^{(i)}(\{x\}, t_n)\}_{n=0}^{N},$$

where $i=1, \ldots, M$ refers to one of M different solution trajectories in the training dataset, and $t_0, \ldots, t_N$ are the time instances at which the state is sampled at a finite number of spatial locations $\{x\}$. Together with each solution trajectory is also stored a time series of control action values $u^{(i)}(t')$ for $i=1, \ldots, M$ and $t_0 \leq t' \leq t_N$.

FIG. 3A illustrates the first stage of training the operator learning model 103, according to some embodiments of the present disclosure. The first stage determines the parameter values $\theta$ of the encoder neural network 108 ($E_\theta$) and the decoder neural network 110 ($D_\theta$). The goal is that the trained encoder is able to compress, or map, a continuous state $f(x,t)$ into a low-dimensional latent vector $z(t)$, and that the trained decoder is able to decompress, or map, the low-dimensional latent vector $z(t)$ back to the same continuous state $f(x,t)$. Each training iteration comprises a forward pass 301 where an entire solution trajectory $$\{f^{(i)}(\{x\}, t_n)\}_{n=0}^{N}$$

for a given i is drawn from the training dataset 107, and given as input to the encoder 108. The encoder 108 then outputs the corresponding trajectory of low-dimensional latent vectors as $$\{z^{(i)}(t_n)\}_{n=0}^{N} = E_\theta(\{f^{(i)}(\{x\}, t_n)\}_{n=0}^{N}).$$

This trajectory of low-dimensional latent vectors is then given as input to the decoder 110, which outputs a trajectory of reconstructed system states $$\{\hat{f}^{(i)}(x, t_n)\}_{n=0}^{N} = D_\theta(\{z^{(i)}(t_n)\}_{n=0}^{N}, x).$$

Each training iteration then comprises the construction of a loss $\mathcal{L}_{AE}$ 302, which consists of two terms. The first term, a reconstruction loss $\mathcal{L}_{AE}^{reconst}$ 303, ensures that the encoder 108 ($E_\theta$) and the decoder 110 ($D_\theta$) are inverse mappings of each other. It is computed from the mean square error as $$\mathcal{L}_{AE}^{reconst} = \sum_n \left\| \hat{f}^{(i)}(\{x\}, t_n) - f^{(i)}(\{x\}, t_n) \right\|^2.$$

The second term, a jerk loss $\mathcal{L}_{AE}^{jerk}$ 304, ensures that the low-dimensional latent vector $z^{(i)}(t_j)$ evolves smoothly from one time step to the next. The jerk loss $\mathcal{L}_{AE}^{jerk}$ jerk constitutes the main novelty of the present disclosure and is motivated by the fact that a smooth evolution of the high-dimensional state $f(x,t)$ over time should also translate into a smooth evolution of the latent vector $z(t)$ over time. The jerk loss is constructed from the norm of the jerk along the trajectory as $$\mathcal{L}_{AE}^{jerk} = \sum_n \left\| z^{(i)}(t_{n+3}) - 3z^{(i)}(t_{n+2}) + 3z^{(i)}(t_{n+1}) - z^{(i)}(t_n) \right\|^2.$$

Finally, during each training iteration, the total loss $\mathcal{L}_{AE} = \mathcal{L}_{AE}^{reconst} + \mathcal{L}_{AE}^{jerk}$ is used to update the parameters $\theta$ of the encoder 108 and the decoder 110 using a gradient descent algorithm such as stochastic gradient descent or the Adam optimizer.

Contrary to the reconstruction loss $\mathcal{L}_{AE}^{reconst}$, which is commonly employed when training encoder-decoders, also called auto-encoders, evaluating the jerk loss $\mathcal{L}_{AE}^{jerk}$ requires using many consecutives states $z^{(i)}(t_n)$, $z^{(i)}(t_{n+1})$, $z^{(i)}(t_{n+2})$, $z^{(i)}(t_{n+3})$ along a given trajectory. In this way, the dynamics of the state $f(x,t)$ are implicitly considered in the first stage of training the operator learning model 103.

It may be noted that each trajectory $$\{f^{(i)}(\{x\}, t_n)\}_{n=0}^{N}$$

may be captured over different spatial locations $\{x\}$ and time instances $t_0, \ldots, t_N$ as compared to the other trajectories. In this case, the loss function should be modified accordingly. To simplify the notation without loss of generality, all trajectories are assumed to be recorded at the same spatial locations and over the same time instances.

FIG. 3B illustrates the second stage of training the operator learning model 103, according to some embodiments of the present disclosure. The second stage determines the parameter values θ of the neural ODE 109 ($h_\theta$). The goal is that the trained neural ODE is able to reproduce the dynamics of the latent vector z(t) in the latent space. Each training iteration comprises a forward pass 303 where an entire solution trajectory $$\{f^{(i)}(x, t_n)\}_{n=0}^{N}$$

for a given i is drawn from the training dataset 107, and given as input to the encoder 108. The encoder 108 then outputs a corresponding trajectory of ground-truth low-dimensional latent vectors as $$\{z^{(i)}(t_n)\}_{n=0}^{N} = E_\theta(\{f^{(i)}(x, t_n)\}_{n=0}^{N}).$$

The first latent vector in this trajectory, $z^{(i)}(t_0)$, is then given as input to the neural ODE 109, together with the time series of control action values for the same trajectory, $u^{(i)}(t)$, $t_0 \leq t \leq t_1$. The neural ODE $\dot{z} = h_\theta(z,u)$ is then integrated from $t_0$ to $t_N$, leading to a predicted latent vector trajectory $\hat{z}^{(i)}(t)$, $t_0 \leq t \leq t_1$.

Each training iteration then comprises the construction of a loss $\mathcal{L}_{NODE}$ 304, which includes a prediction loss term that ensures that the trajectory of predicted latent vectors is similar to the trajectory of ground truth latent vectors. It is computed from the mean square error as $$\mathcal{L}_{NODE} = \sum_n \left\| \hat{z}^{(i)}(t_n) - z^{(i)}(t_n) \right\|^2$$

Finally, during each training iteration, the loss $\mathcal{L}_{NODE}$ is used to update the parameters θ of the neural ODE 109 using a gradient descent algorithm such as stochastic gradient descent or the Adam optimizer.

The method of training the operator learning model 103 may further include incorporating the PDEs of the physical model 105 into the training loss $\mathcal{L}_{NODE}$ of the neural ODE 109. In this case, the method may include generating arbitrary states f({x}) sampled at a finite number of spatial locations {x}, where each state satisfies the boundary conditions and other constraints of the system. Furthermore, the states f({x}) should be physically attainable by the system. A term $\mathcal{L}_{NODE}^{phys}$ is then added to $\mathcal{L}_{NODE}$ that enforces consistency between the dynamics induced by the neural ODE 109 and the dynamics given by the PDEs in the physical model 105, at these states f({x}).

The steps of the above operator learning model generator can be performed in a device comprising a processor connected to a memory and an interface circuit, as known in the art. For example, the interface circuit may be configured to receive the training dataset 107 via a network connected to the simulation computer containing the numerical solver 106. The memory may be configured to store the operator learning model 103, the training dataset 107, and the training instructions described above to train the operator learning model 103. The processor may be configured to train the operator learning model stored in the memory using the training dataset 107 and the training instructions. Thanks to the jerk regularization that enforces the smoothness of the dynamics, the accuracy of the trained operator learning model is substantially improved over the current state-of-the-art, and the trained operator learning model can be used effectively in compact control systems. The device may form a self-contained system that can be sold to a sustomer in a single unit.

Figure 4:
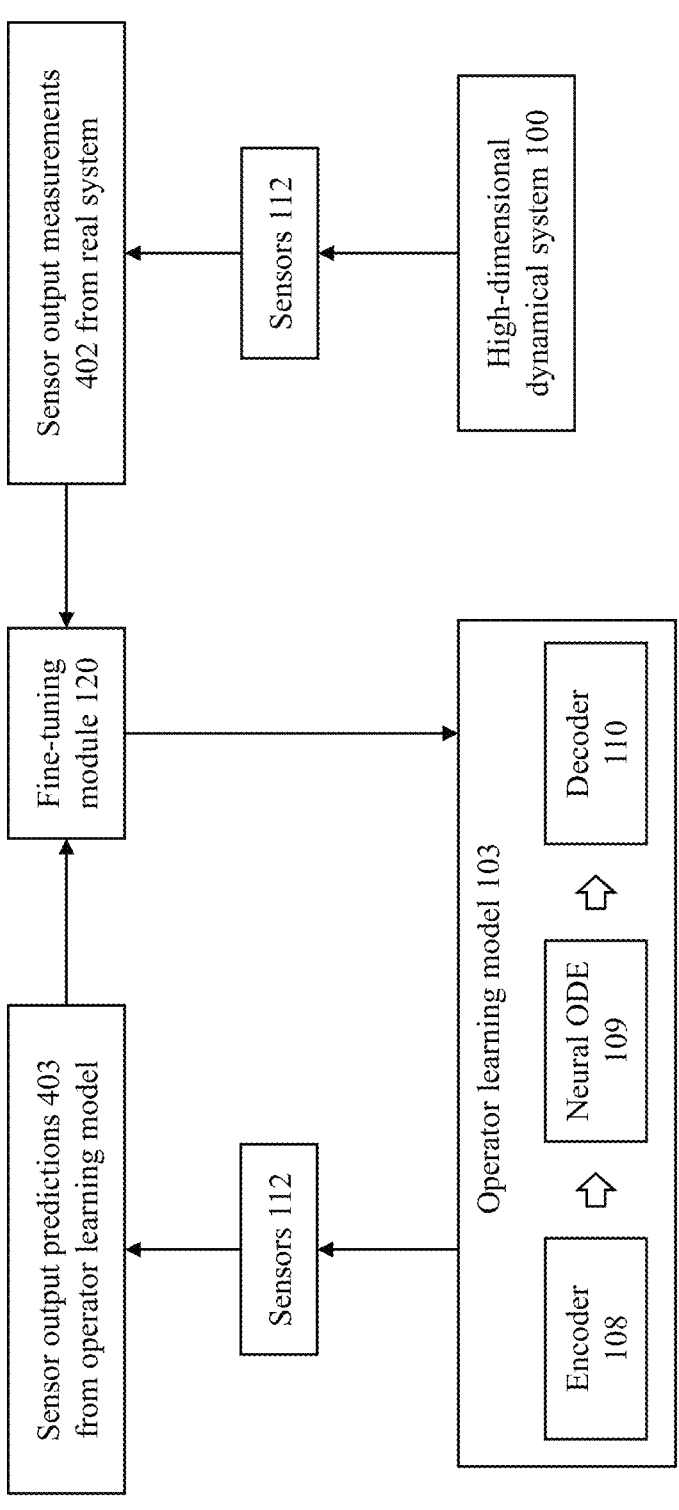
FIG. 4 is a block diagram for fine-tuning in real-time the parameters of the operator learning model online, according to according to some embodiments of the present disclosure.

FIG. 4 is a block diagram for fine-tuning in real-time the parameters of the operator learning model 103 using sensor measurements, according to according to some embodiments of the present disclosure. Sensors 112 measuring different components of the state f at various locations x may be placed in the real system 100 to collect sensor output measurements 402 during online operation of the system. In parallel, after the operator learning model 103 is trained in the offline stage as described in FIG. 3A and FIG. 3B, the operator learning model may be used to compute sensor output predictions 403 at the sensors 112. The parameter values θ of the operator learning model 103 may then be fine-tuned in real time in the fine-tuning module 120 based on the difference between the sensor output predictions 403 and the sensor output measurements 402.

Figure 5A:
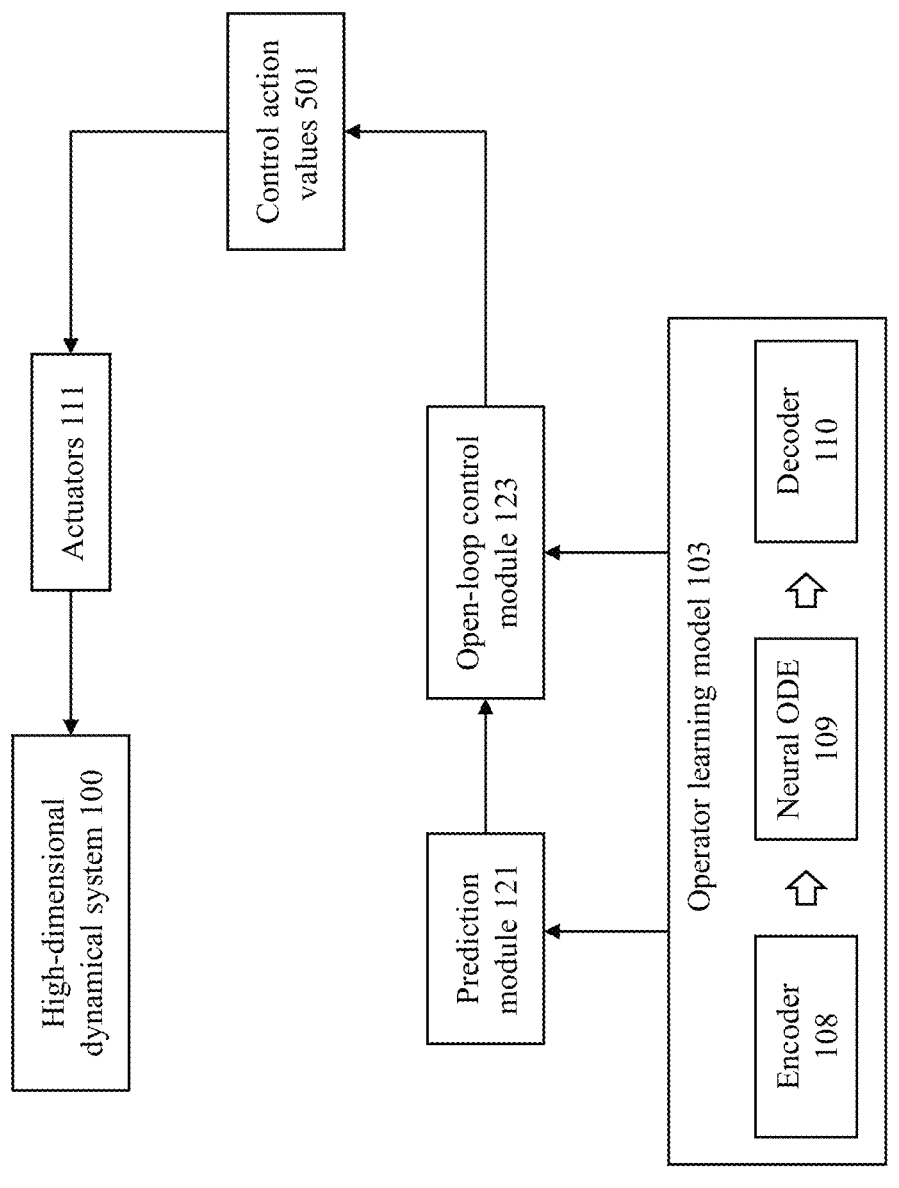
FIG. 5A is a block diagram illustrating online open-loop control of the operation of the dynamical system using the operator learning model, according to according to some embodiments of the present disclosure.

FIG. 5A is a block diagram illustrating online open-loop control of the operation of the dynamical system 100 using the operator learning model 103, according to some embodiments of the present disclosure. Once the operator learning model 103 is trained in the offline stage as described in FIG. 3A and FIG. 3B, it may be used in the prediction module 121 to compute trajectories of the system for various initial conditions of the state and various time series of control action values. Based on these trajectories as well as the operator learning model 103, an open-loop control policy in the control module 123 may be used to compute in real time a time series of optimal control action values 501, which may be given to the actuators 111 to affect the online operation of the system 100 to achieve a desired outcome defined by an objective function specified by a user.

Figure 5B:
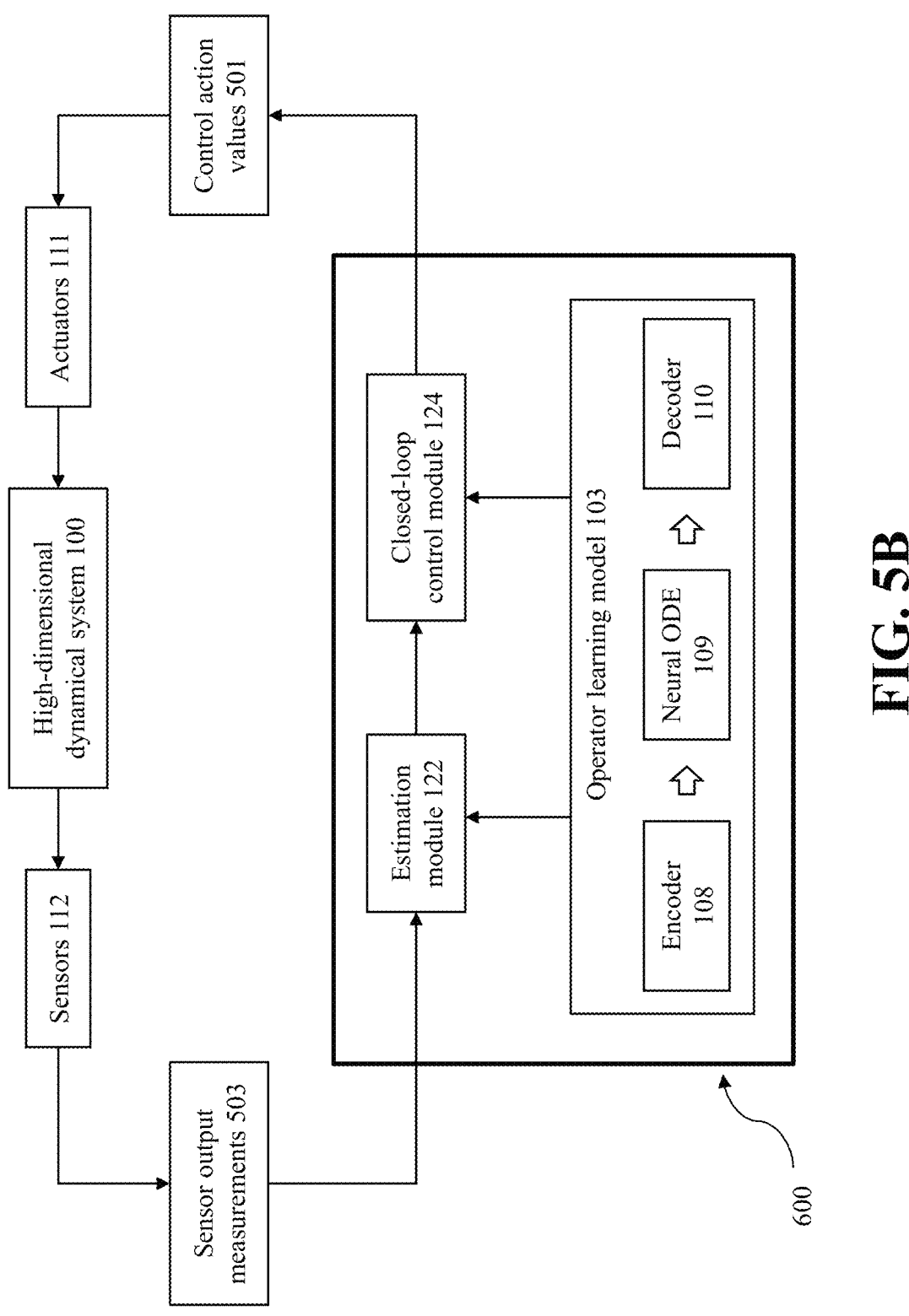
FIG. 5B is a block diagram illustrating online closed-loop control of the operation of the dynamical system using the operator learning model, according to according to some embodiments of the present disclosure.

FIG. 5B is a block diagram illustrating online closed-loop control of the operation of the dynamical system 100 using the operator learning model 103, according to some embodiments of the present disclosure. Sensors 112 may be placed in the real system 100, collecting in real time measurements 503 of different components of the state f at various locations x during the online operation of the system. In addition, actuators 111 may be placed in the real system 100, allowing to control the online operation of the system by acting on its state f at various locations x. Once the operator learning model 103 is trained in the offline stage as described in FIG. 3A and FIG. 3B, it may be used in the estimation module 122 to compute the current estimated state of the system 100 from the sensor measurements 503 collected in real time. Based on the estimated state as well as the operator learning model 103, a closed-loop control policy in the control module 124 may be used to compute in real time a time series of optimal control action values 501, which may be given to the actuators 111 to control the online operation of the system 100 to achieve a desired outcome defined by an objective function specified by a user.

Figure 6:
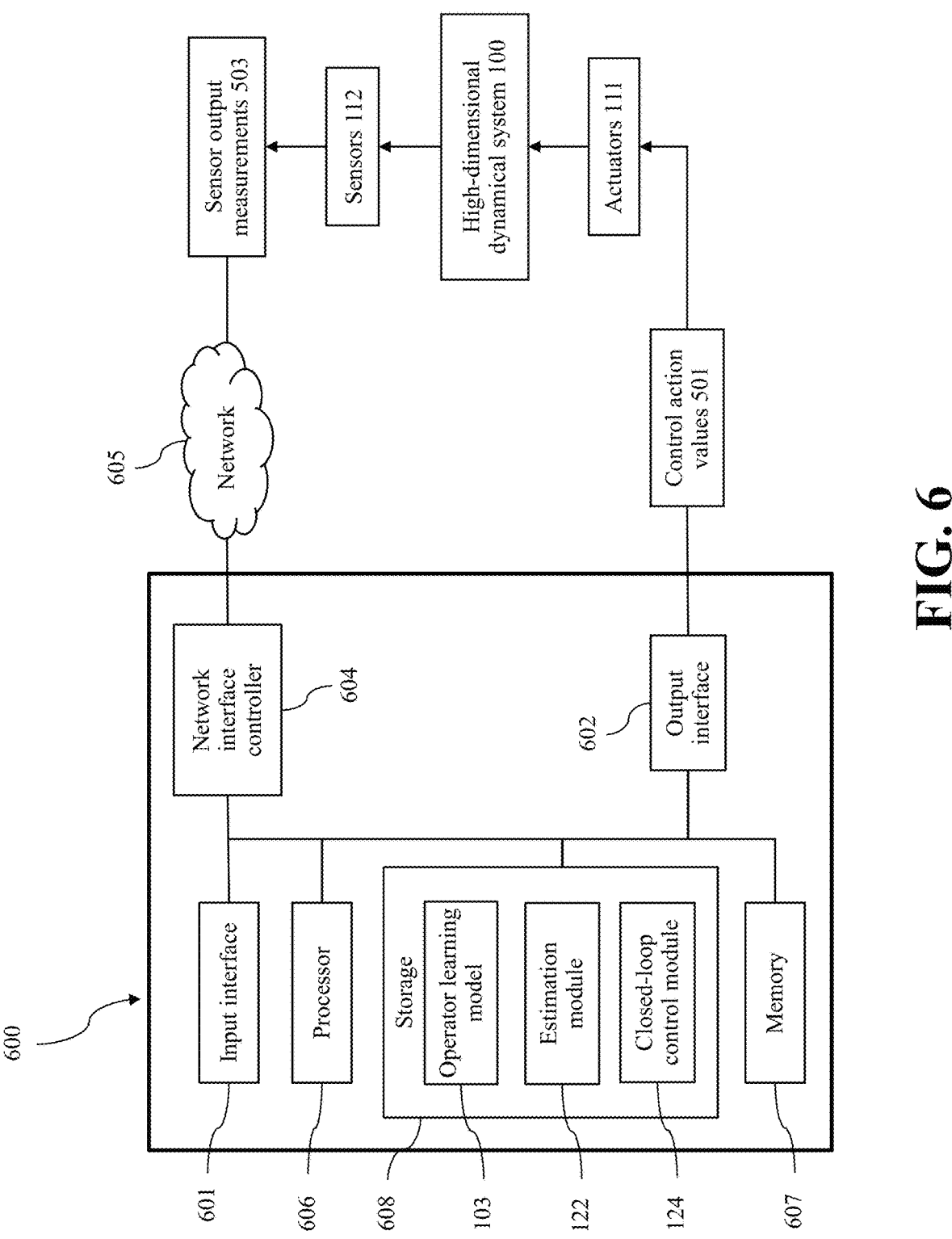
FIG. 6 is a block diagram of an apparatus for controlling the operation of the system, according to some embodiments of the present invention.

FIG. 6 shows a block diagram of a control apparatus 600 (also called a controller) for online closed-loop control of the operation of the dynamical system 100, according to some embodiments. The apparatus 600 includes an input interface 601 and an output interface 602 for connecting the apparatus 600 with other systems and devices. In some embodiments, the apparatus 600 may include a plurality of input interfaces and a plurality of output interfaces. The input interface 601 is configured to receive real-time sensor output measurements 503 from sensors 112 of the dynamical system 100 using a network interface controller (NIC) 604 connected to a network 605. Through the input interface 601, network interface controller (NIC) 604, and network 605, the apparatus 600 receives real-time sensor output measurements 503 of the dynamical system 100, either wirelessly or through wires.

The apparatus 600 further includes a processor 606 and a memory 607 that stores instructions that are executable by the processor 606. The processor 606 may be a single core processor, a multi-core processor, a computing cluster, or any number of other configurations. The processor 606 is connected to one or more input and output devices. The memory 607 may include random access memory (RAM), read only memory (ROM), flash memory, or any other suitable memory system. The memory 607 may be further extended to include storage 608. The storage 608 may be configured to store the trained smooth operator learning model 103, the estimation module 122, and the closed-loop control module 124. The processor 606 may execute the instructions stored in the trained operator learning model 103, the estimation module 122, and the closed-loop control module 124, to compute optimal control action values 501 based on the sensor output measurements received by the input interface 601. Thanks to the jerk loss included in the offline training procedure of the operator learning model 103, as described in FIG. 3A and FIG. 3B, the operator learning model 103 has high accuracy despite being able to run on the limited computing capabilities of the processor 606, resulting in effective optimal control action values 501. The output interface 602 is configured to transmit the optimal control action values 501 to actuators 111 of the system 100 to control its operation in a way that minimizes the objective function specified by the user.

Figure 7:
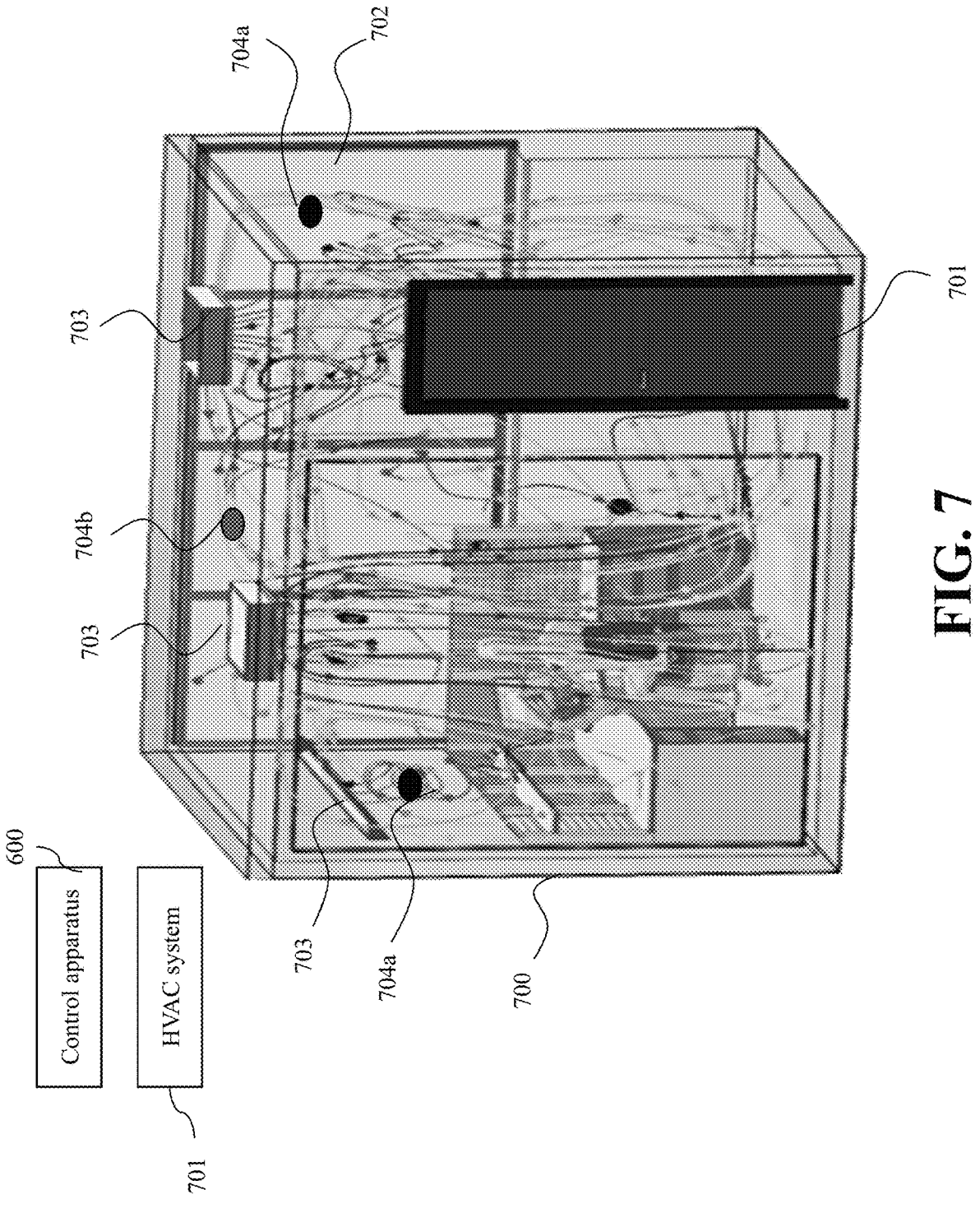
FIG. 7 shows an exemplary real-time implementation of the apparatus for controlling the system, wherein the system is a room with an air-conditioning and ventilation (HVAC) system, according to embodiments of the present invention.

FIG. 7 shows an exemplary real-time implementation of the control apparatus 600 for controlling the dynamical system 100, wherein the dynamical system 100 is, in this example, a room 700 with a door 701 and at least one window 702. The temperature and the airflow of the room 700 are controlled by the apparatus 600 via a heating, ventilation and air conditioning (HVAC) system 701 through air vent units 703 (i.e., the ventilation units 703 are the actuators of the room 700). The control actions specified by the apparatus 600 may include the temperature, velocity magnitude, and velocity direction of the airflow generated by the HVAC system at each ventilation unit 703. A set of sensors 704 is arranged in the room 700, which may comprise one or more sensors 704a for measuring the airflow velocity at a given point, and one or more sensors 704b for measuring the airflow temperature at a given point. Other settings may also be considered, for example a room with multiple HVAC systems, or a house with multiple rooms.

The smooth operator learning model 103 contained in the control apparatus 600 is first trained offline with the jerk loss according to the steps described in FIG. 3A and FIG. 3B, resulting in a smooth operator learning model with high prediction accuracy that can run on the limited computing capabilities of the processor 606 in the control apparatus 600. Then, the control apparatus 600 may be used online with real-time measurements from the velocity and temperature sensors 704 to compute and send optimal control actions to the air-conditioning system 701 to control the airflow velocity and temperature in the room 700 in a way that achieves the desired outcome defined by the objective function. This outcome may comprise minimizing the airflow velocity or reaching a target temperature everywhere in the room. In some embodiments, the coupled Navier-Stokes and heat PDEs governing the dynamics of airflow velocity and temperature in the room 700 may be included in the training procedure of the operator learning model 103, as described in FIG. 3B.

The control apparatus 600 can be embedded in a device to form a self contained system that can be sold to a sustomer in a single unit, ready to operator and perform the functions of the mention when installed in an environment, such as a room with an HVAC system.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Although the present disclosure describes the invention by way of examples of preferred embodiments, it is understood that various other adaptations and modifications may be made within the spirit and scope of the invention. Therefore, it is the object of the appended claims to cover all such variations and modifications as come within the true spirit and scope of the invention.

The invention claimed is:

1. An operator learning model generator for training a smooth operator learning model including an auto-encoder and a neural ordinary differential equation (ODE) used by a controller connected to a heating, ventilation and air conditioning (HVAC) system installed in a room, comprising:

an interface circuit configured to receive a training dataset via a network connected to a simulation computer, wherein the training dataset includes solution trajectories of airflow in the room for various times series of control actions given to the HVAC system;

a memory configured to store a smooth operator learning model for predicting dynamics of airflow in the room, the training dataset, and training instructions for the smooth operator learning model; and a processor configured to train the smooth operator learning model stored in the memory, wherein the training instructions comprise steps of:

training the auto-encoder to learn a mapping from a high-dimensional state of the system to a low-dimensional latent vector based on a training loss, wherein the training loss includes both a reconstruction loss and a jerk loss evaluated on the solution trajectories belonging to the training dataset;

training the neural ODE to learn the solution trajectories belonging to the training dataset mapped through the encoder to the low-dimensional latent space generating in real time optimal control actions to minimize a user-defined cost objective function by applying an open-loop control policy to the trained smooth operator learning model; and transmitting the generated optimal control actions to the actuators of the HV AC system via an interface circuit, to control the airflow in the room.

2. The operator learning model generator of claim 1, further comprising:

generating in real time optimal control actions to minimize a user-defined cost objective function by applying an estimation and closed-loop control policy to the trained smooth operator learning model, and using the sensor measurements collected in real time; and transmitting the generated optimal control actions to the actuators of the HVAC system via an interface circuit, to control the airflow in the room.

3. The operator learning model generator of claim 2, wherein the training loss for the neural ODE includes a physics-informed term that enforces partial differential equations (PDEs) describing the physical model of system dynamics.

4. The operator learning model generator of claim 1, wherein the training loss for the neural ODE includes a physics-informed term that enforces partial differential equations (PDEs) describing the physical model of system dynamics.

5. The operator learning model generator of claim 1, wherein parameters of the trained operator learning model are fine-tuned in real-time using sensor measurements collected during online operation of the system.

6. The operator learning model generator of claim 1, wherein the training loss for the neural ODE includes a physics-informed term that enforces partial differential equations (PDEs) describing the physical model of system dynamics.

7. A computer-implemented method for training a smooth operator learning model including an auto-encoder and a neural ordinary differential equation (ODE) used by a controller for a continuously operating dynamical system in an engineered process or a machine, comprising:

receiving, using an interface circuit, a training dataset via a network connected to a simulation computer, wherein the training dataset include a collection of solution trajectories of the system for various time series of control actions;

uploading a smooth operator learning model for predicting the dynamics of the continuously operating dynamical system, the training dataset, and training instructions to a processor from a memory; and training, using the processor, the smooth operator learning model based on the training instructions, wherein the training instructions comprise steps of:

training the auto-encoder to learn a mapping from a high-dimensional state space to a low-dimensional latent space based on a training loss, wherein the training loss includes both a reconstruction loss and a jerk loss evaluated on the solution trajectories belonging to the training dataset;

training the neural ODE to learn the solution trajectories belonging to the training dataset mapped through the encoder to the low-dimensional latent space;

generating in real time optimal control actions to minimize a user-defined cost objective function by applying an open-loop control policy to the trained smooth operator learning model; and transmitting the generated optimal control actions to actuators via an interface circuit, to control the dynamical system in the engineered process or the machine.

8. The computer-implemented method of claim 7, further comprising:

generating control actions by applying an estimation and closed-loop control policy to the trained smooth operator learning model, using the states measured from sensors; and transmitting the generated optimal control actions to actuators via an interface circuit, to control the dynamical system in the engineered process or the machine.

9. The computer-implemented method of claim 8, wherein the training loss for the neural ODE includes a physics-informed term that enforces partial differential equations (PDEs) describing the physical model of the system dynamics.

10. The computer-implemented method of claim 7, wherein the training loss for the neural ODE includes a physics-informed term that enforces partial differential equations (PDEs) describing the physical model of the system dynamics.

11. The computer-implemented method of claim 7, wherein the training loss for the neural ODE includes a physics-informed term that enforces partial differential equations (PDEs) describing the physical model of the system dynamics.

12. The computer-implemented method of claim 7, wherein parameters of the trained operator learning model are fine-tuned in real-time using sensor measurements collected during online operation of the system.

\* \* \* \* \*